US012762395B2

(12) United States Patent
Prasad et al.

(10) Patent No.: US 12,762,395 B2
(45) Date of Patent: Oct. 13, 2026

(54) TRAINING A NEURAL NETWORK MODEL ACROSS MULTIPLE DOMAINS

(71) Applicant: THE BANK OF NEW YORK MELLON, New York, NY (US)

(72) Inventors: Abhinav Prasad, New York, NY (US); Beibei Liu, New York, NY (US); Romil Rathi, New York, NY (US); Richard Marquis, New York, NY (US); Rajeev Sambyal, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 1049 days.

(21) Appl. No.: 17/884,205

(22) Filed: Aug. 9, 2022

(65) Prior Publication Data

US 2023/0359884 A1 Nov. 9, 2023

Related U.S. Application Data

(60) Provisional application No. 63/339,141, filed on May 6, 2022.

(51) Int. Cl.
*G06N 3/08* (2023.01)
*G06N 3/045* (2023.01)

(52) U.S. Cl.
CPC ............... *G06N 3/08* (2013.01); *G06N 3/045* (2023.01)

(58) Field of Classification Search
CPC ........ G06N 3/08; G06N 3/045; G06N 3/0455; G06N 7/01; G06N 20/00; G06N 3/09;
(Continued)

(56) References Cited

U.S. PATENT DOCUMENTS 10,936,947 B1 3/2021 Flunkert et al.
2016/0093048 A1 3/2016 Cheng
(Continued)

OTHER PUBLICATIONS

International Preliminary Report on Patentability, dated Nov. 7, 2024, issued in corresponding International Application No. PCT/US2023/066497 (11 pgs.).
(Continued)

*Primary Examiner* — Jennifer N Welch
*Assistant Examiner* — Amy P Hoang
(74) *Attorney, Agent, or Firm* — Pillsbury Winthrop Shaw Pittman, LLP

(57) ABSTRACT

The disclosure relates to systems and methods of generating a mixture model for approximating non-normal distributions of time series data. The mixture model may include clusters of normal distributions that together approximate a non-normal distribution. The mixture model may be used to normalize input data for machine learning models. For example, a machine learning model such as an autoencoder may be trained to make predictions on the normalized input data. The predictions may relate to the time series of data. In one example, the time series of data may be market data for a security. The market data my include one or more features that are normalized using the mixture model. The predictions may include a predicted rate at which a lender will charge to borrow a security for short selling, where such rate may depend on the market data for the security.

20 Claims, 11 Drawing Sheets

(58) Field of Classification Search
CPC ... G06N 3/0442; G06Q 30/0202; G06Q 40/04
See application file for complete search history.

(56) References Cited

U.S. PATENT DOCUMENTS

| | | | | |
|---|---|---|---|---|
| 2018/0150547 | A1 | 5/2018 | Pallath | |
| 2018/0189326 | A1* | 7/2018 | Santos | G06F 16/51 |
| 2019/0036795 | A1 | 1/2019 | Ouyang | |
| 2020/0067969 | A1 | 2/2020 | Abbaszadeh | |
| 2020/0159925 | A1 | 5/2020 | Parlak | |
| 2021/0158156 | A1 | 5/2021 | Shamir | |
| 2021/0193255 | A1* | 6/2021 | Kamneva | G16B 5/20 |
| 2021/0256378 | A1* | 8/2021 | Watt | G06N 3/044 |
| 2021/0263954 | A1 | 8/2021 | Mizutani | |
| 2022/0103444 | A1 | 3/2022 | Ranjan | |
| 2023/0267304 | A1* | 8/2023 | Bae | G06N 3/0442 706/30 |
| 2023/0267352 | A1* | 8/2023 | He | G06N 20/00 706/12 |

OTHER PUBLICATIONS

International Search Report and Written Opinion of the International Searching Authority dated Jul. 27, 2023, issued in corresponding International Application No. PCT/US2023/066497 (15 pgs.).
Hui Li et al., "Multivariate Financial Time-Series Prediction with Certified Robustness", IEEE Access, IEEE, USA, vol. 8, Jun. 9, 2020, pp. 109133-109143.
Nikolaos Passalis et al., "Forecasting Financial Time Series Using Robust Deep Adaptive Input Normalization", Journal of Signal Processing Systems (2021) 93:1235-1251.
Mic Bowman et al., "Reasoning About Naming Systems", ACM Transactions on Programming Languages and Systems, vol. 15, No. 5, Nov. 1993, pp. 795-825.
Leonard D. Brown et al., "A Widget Framework for Augmented Interaction in SCAPE", In Proceedings of the 16th Annual ACM Symposium on User Interface Software and Technology, (Vancouver Canada, Nov. 2-5, 2003), Letters CHI, vol. 5, Issue 2, pp. 1-10.
Wei Ding et al., "A Study on Video Browsing Strategies", Technical Report, University of Maryland at College Park, 1997 (18 pgs.).
A.Z. Spector, "Chapter 2—Achieving Application Requirements on Distributed Systems Architectures", Distributed Systems, ACM Press Frontier Series, New York, NY, 1989 (pp. 19-33).
George Forman, "An Extensive Empirical Study of Feature Selection Metrics for Text Classification", Journal of Machine Learning Research 3 (2003) pp. 1289-1305.
Bernd Frohlich et al., "The Cubic Mouse A New Device for Three-Dimensional Input", CHI 2000, Apr. 1-6, 2000, vol. 2, Issue 1, pp. 526-531.
Yann Lecun et al., "Efficient BackProp", AT&T Laboratories, 1996, (45 pgs.).
Yuen Tak Yu et al., "A comparison of MC/DC, MUMCUT and several other coverage criteria for logical decisions", The Journal of Systems and Software, 79 (2006) pp. 577-590.
Sannella, M. J., "Constraint Satisfaction and Debugging for Interactive User Interfaces", Doctoral Thesis (1994) UMI Order Number: UMI Order No. GAX95-09398., University of Washington, (303 pgs.).
Wei Bao et al., "A deep learning framework for financial time series using stacked autoencoders and long-short term memory", PLOS ONE, Jul. 14, 2017, pp. 1-24.
International Search Report and Written Opinion of the International Searching Authority dated Aug. 8, 2023, issued in corresponding International Application No. PCT/US2023/066502 (13 pgs.).
Dilek Hakkani-Tur et al., "Multi-Domain Joint Semantic Frame Parsing using Bi-directional RNN-LSTM", Interspeech 2016, vol. 2016, Sep. 8-12, 2016, San Francisco, USA, pp. 715-719.
Wenchao Sun et al., "Parallel Split-Join Networks for Shared Account Cross-domain Sequential Recommendations", arxiv.org, Cornell University Library, 201 Olin Library Cornell University Ithaca, NY, pp. 1-21.
International Preliminary Report on Patentability, dated Nov. 7, 2024, issued in corresponding International Application No. PCT/US2023/066502 (12 pgs.).

* cited by examiner

TRAINING A NEURAL NETWORK MODEL ACROSS MULTIPLE DOMAINS

CROSS-REFERENCE TO RELATED APPLICATIONS

This application claims the benefit of priority of U.S. Provisional Application No. 63/339,141, filed on May 6, 2022, which is incorporated by reference in its entirety herein for all purposes. This application is related to co-pending U.S. patent application Ser. No. 17/884,165, entitled "RECURRENT NEURAL NETWORKS WITH GAUSSIAN MIXTURE BASED NORMALIZATION," which is incorporated by reference in its entirety herein for all purposes.

BACKGROUND

Machine learning systems, such as those that use Recurrent Neural Networks (RNNs) and other deep learning models, may be most accurate when input data is normalized using accurate approximations of a distribution of input data. However, when the input data follows a non-normal distribution, accurate approximations of the input data may be difficult to achieve. For example, normalization involves determining one or more normalization metrics such as a mean and variance of the distribution, which may not be representative of a non-normal distribution of data. In this scenario, mis-approximation of the non-normal distribution occurs. This mis-approximation causes underfitting or overfitting, resulting in prediction error by machine learning models trained on or making predictions for the normalized data. Furthermore, when predictions for multiple domains of input data, such as multiple independent time series of data, are to be made, machine learning systems may train, use, and store models that are specific for each time series. This may result in high computational load to train and use the models and high memory storage requirements to store the models. Furthermore, the use of serial RNNs prevalent in machine learning systems may cause performance delays and inefficiencies when training and using machine learning models. These and other issues may exist in machine learning systems.

SUMMARY

Various systems and methods may address the foregoing and other problems. For example, to address non-normal distribution of input data, the system may generate and use a mixture model that includes multiple clusters of normal distributions that approximate the non-normal distribution. An example of a mixture model may include a Gaussian Mixture Model (GMM). The system may generate a mixture model by identifying multiple clusters of normal distributions within the non-normal distribution of the input data. For a given data point in the input data, the system may identify a cluster to which the data point belongs. For example, the system may find the nearest cluster based on a minimum distance metric, such as a minimum distance between the data point and mean of a cluster. The system may then normalize the data point based on the identified cluster. For example, the system may normalize the data point based on the mean and variance of the identified cluster. In this way, the system may ensure that machine learning models do not underfit or overfit the input data.

In some examples, a machine learning model may be trained to use input data that was normalized using the mixture model. For example, the machine learning model may include an autoencoder. The autoencoder may use an encoder trained by a neural network to generate a compressed version of the normalized input data. The autoencoder may use a decoder trained by a neural network to generate a recreated version of the normalized input data based on the compressed version. The goal of the autoencoder is to recreate the normalized input data from the compressed version of the normalized input data. In this manner, the autoencoder may be trained to predict changes or variation from a training data set. By using normalized data from the mixed model, the autoencoder is able to make more accurate predictions on non-normal distributions that may be present in the input data.

To address the computational load and memory footprint imposed by training, storing, and using multiple machine learning models for each domain of input data, the system may train, store, and use a reduced set of machine learning models that covers the domains of the input data. For example, the system may train, use, and store a single machine learning model that covers the domains of the input data. In particular, the system may train, use, and store a single Long-term Short-term Memory (LSTM) model that covers the domains of the input data. To do so, the system may generate a set of sequences for each time series of data and append the sets of sequences together to train a single LSTM model. Doing so enables the system to identify model weights and relationships among features and a target variable that are pertinent across the diverse domains of input data.

To address the inefficiencies of serial RNN architectures, the system may implement a parallel neural network (such as RNN) architecture that merges the output of multiple neural networks that execute in parallel. In this manner, the system may leverage multiple neural networks in parallel such as, for example, to train or execute machine learning models.

DETAILED DESCRIPTION

Figure 1:
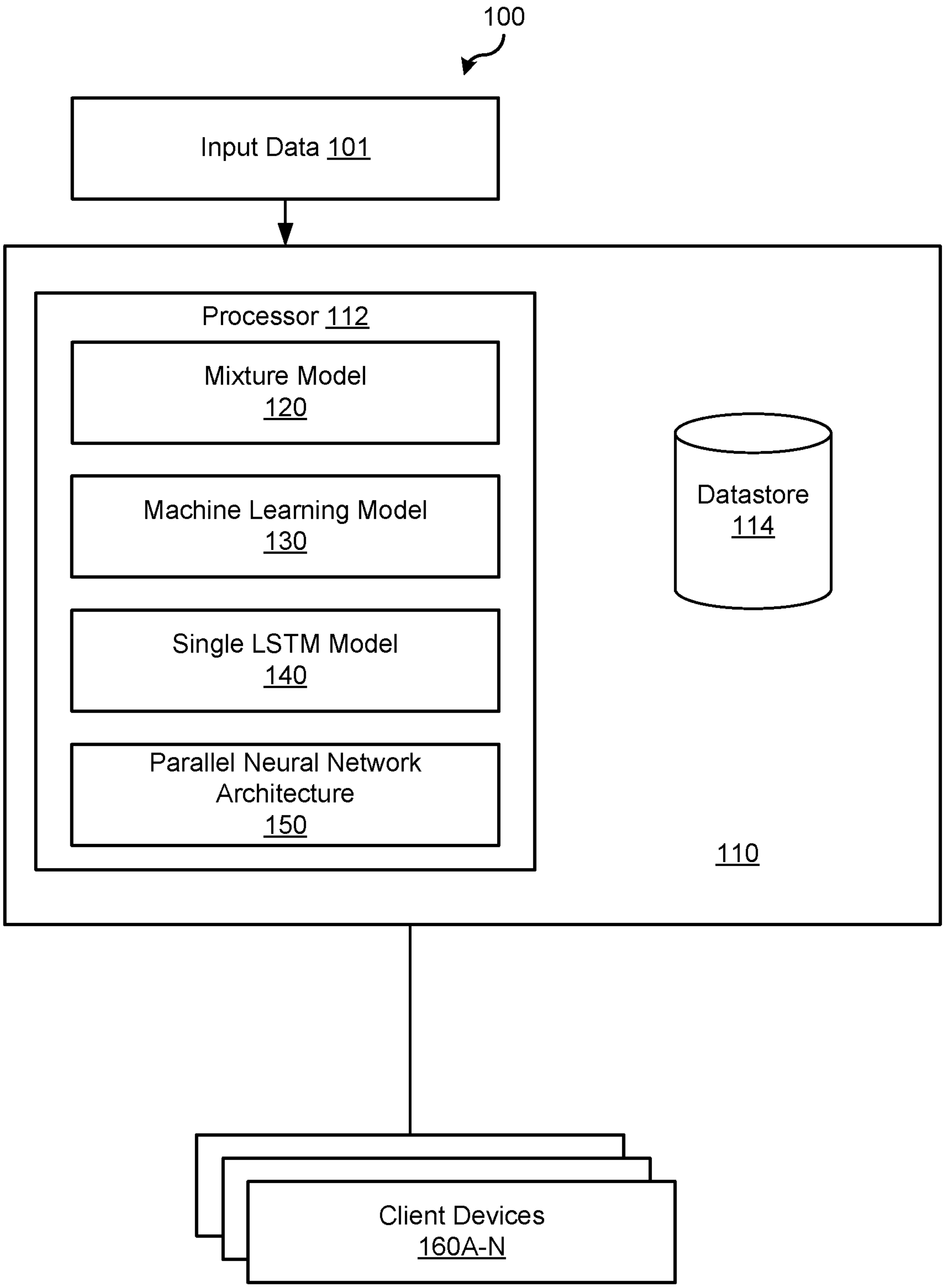
FIG. 1 shows an illustrative system for predicting a direction and/or magnitude of input data that exhibits a non-normal distribution using accuracy-improving Gaussian mixture normalization, machine learning models trained to use the normalized input data to generate the predictions, a single LSTM model for multiple domains, and/or parallel neural network architectures for efficient learning and execution.

FIG. 1 shows an illustrative system 100 for predicting a direction and/or magnitude of input data 101 using a mixed model that improves approximation of non-normal distributions, machine learning models trained to use the output of the mixed model to generate the predictions, a single machine learning model for multiple domains of input data, and/or parallel neural network architectures for efficient learning and execution.

As shown in FIG. 1, the system 100 may include a computer system 110, one or more client devices 160 (illustrated as client devices 160A-N), and/or other components. The computer system 110 may access input data 101 and make predictions on the direction and/or magnitude relating to the input data. A direction may refer to whether data values relating to the input data 101 will increase, decrease, or stay the same in the future. A magnitude may refer to an amount of change relating to the input data 101 that will occur in the future, such as an amount of increase or decrease in the data values.

The input data 101 may include a time series of data values that exhibit a non-normal distribution. For example, the input data 101 may include values that vary over time and do not fit a Gaussian distribution. Machine-learning models trained and/or executed on non-normal data may result in overfitting or underfitting. Thus, the machine-learning models will not be sufficiently flexible to make predictions on diverse input data 101 and will instead be inaccurate over a range of data values.

Furthermore, the input data 101 may relate to one of multiple domains. A domain refers to a set of data that relates to a particular entity or subject matter. For example, input data in a first domain may be independent from and behave differently than input data in a second domain. Thus, the existence of multiple domains of input data may conventionally require training, storing, and using machine learning models for each domain.

The particular types of values in the input data 101 and the domains to which they relate will depend on the context in which the computer system 110 is programmed to make predictions. To illustrate, various examples used herein will describe the input data 101 as a time series of securities market data such as price to predict rates securities lenders charge in exchange for lending shares of a security to a borrower. A lender may loan shares of a security to a borrower, who may then short sell the borrowed shares. A domain in this context will refer to a specific security. Thus, first input data 101 for a first security (first domain) may be independent from and change in directionality or magnitude differently than second input data 101 for a second security (second domain).

Predicting the direction and/or magnitude of the rate that security lenders charge would be advantageous for competing security lenders and others. However, applying machine learning systems to the time series of market data (or other non-normal distributions of data) would result in overfitting or underfitting because the market data may exhibit non-normal behavior. Thus, machine learning systems may not accurately predict rates based on the market data. Furthermore, because there are many different securities, each with their respective time series of market data, machine learning systems may include machine learning models trained for each security. However, the quantity of securities means that the number of machine learning models that are trained, stored, and used may be computationally prohibitive from a processor load perspective and/or a computer memory storage perspective.

It should be noted that the system 100 may make predictions in other contexts having non-normal distributions of input data 101. For example, the input data 101 may relate to estimation of noise characteristics in wireless networks, time series problems in medical devices and pharmaceutical development, vehicle-to-vehicle and machine-to-machine communications, a time series of the number of server requests that a server or server system encounters, a time series of a number of potential intrusions or other network anomalies, a time series of the number of sales of a given item, a time series of a number of device failures over time, and/or other input data 101 that may exhibit non-normal distributions. Each of these examples may suffer from the same issues as in the context of lender rates.

To address the foregoing and other issues, the computer system 110 may include one or more processors 112, a datastore 114, and/or other components. The processor 112 may include one or more of a digital processor, an analog processor, a digital circuit designed to process information, an analog circuit designed to process information, a state machine, and/or other mechanisms for electronically processing information. Although processor 112 is shown in FIG. 1 as a single entity, this is for illustrative purposes only. In some embodiments, processor 112 may comprise a plurality of processing units. These processing units may be physically located within the same device, or processor 112 may represent processing functionality of a plurality of devices operating in coordination.

As shown in FIG. 1, processor 112 is programmed to execute one or more computer program components. The computer program components may include software programs and/or algorithms coded and/or otherwise embedded in processor 112, for example. The one or more computer program components or features may include a mixture model 120, a machine-learning model 130, a single LSTM model 140, a parallel neural network architecture 150, and/or other components or functionality.

Processor 112 may be configured to execute or implement 120, 130, 140, and 150 by software; hardware; firmware; some combination of software, hardware, and/or firmware; and/or other mechanisms for configuring processing capabilities on processor 112. It should be appreciated that although 120, 130, 140, and 150 are illustrated in FIG. 1 as being co-located in the computer system 110, one or more of the components or features 120, 130, 140, and 150 may be located remotely from the other components or features. The description of the functionality provided by the different components or features 120, 130, 140, and 150 described below is for illustrative purposes, and is not intended to be limiting, as any of the components or features 120, 130, 140, and 150 may provide more or less functionality than is described, which is not to imply that other descriptions are limiting. For example, one or more of the components or features 120, 130, 140, and 150 may be eliminated, and some or all of its functionality may be provided by others of the components or features 120, 130, 140, and 150, again which is not to imply that other descriptions are limiting. As another example, processor 112 may include one or more additional components that may perform some or all of the functionality attributed below to one of the components or features 120, 130, 140, and 150.

The computer system 110 may generate the mixture model 120 to normalize the input data 101. The mixture model 120 may be a Gaussian mixture model. In some examples, the input data 101 may include feature columns in which feature values are presented in a time series and each feature value is normalized according to the mixture model 120. In the context of securities, the feature columns may include model features that correlate to a predicted outcome, such as the direction and/or magnitude of the input data 101. A model feature may refer to a quantifiable value that may correlate with a predicted outcome. For example, the value of a model feature may be represented as a feature vector. The specific model features used may be context dependent. For example, in the context of securities lending rates, model features may include historical bid/ask prices, open/close prices, sentiment analysis, earnings, and/or other quantifiable aspects of securities that may correlate with the direction and/or magnitude of securities lending rates.

The mixture model 120 may represent a distribution in the input data 101 according to Equation 1:

$$p(x) = \sum_{k=1}^{k} \pi_k N\left(x|u_k, \sum_k\right), \tag{1}$$

in which:

k=number of clusters, $\pi_k$ represents mixing coefficients, where $$\sum_{k=1}^{k} \pi_k = 1 \text{ and } \pi_k \geq 0 \forall\, k$$

The mixture model 120 may include a mixture of k-clusters of normal distributions within the input data 101, in which "k" is an integer (referred to as the "k-value"). The default k-value may be set to two for rapid analysis. However, in some examples, the computer system 110 may use an optimal k-value, such as by applying an optimization routine to identify the optimal k-value. One example of an optimization routine that may be used is an elbow method. The elbow method is a technique for selecting a point at which a result is acceptable and beyond which diminishing returns from a cost perspective to achieve that result is reached. In the context of the mixture model 120, higher k-values (greater number of clusters of normal distributions) will result in more accurate approximation of the input data 101 for normalization, but at the cost of computational overhead to compute and store additional clusters. Thus, an optimal k-value is one in which the number of clusters (defined by the k-value) is acceptable for approximating the input data 101 and beyond which the cost of computational overhead for additional clusters exhibits diminishing returns. Put another way, the optimization may attempt to find the lowest number k-value that results in approximation of the input data 101 beyond which higher k-values do not enhance approximation that is worth the computational overhead of additional clusters.

Figure 2:
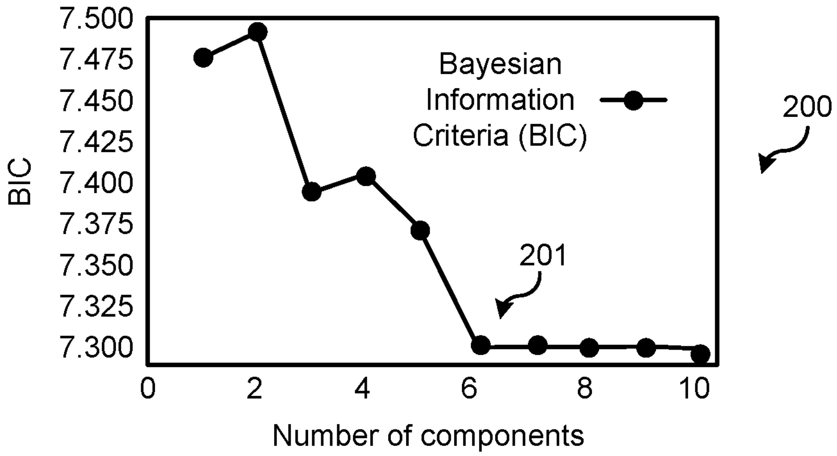
FIG. 2 shows a plot of k-values for selecting an optimal k-value used for the mixture model, according to an embodiment.
Figure 3A:
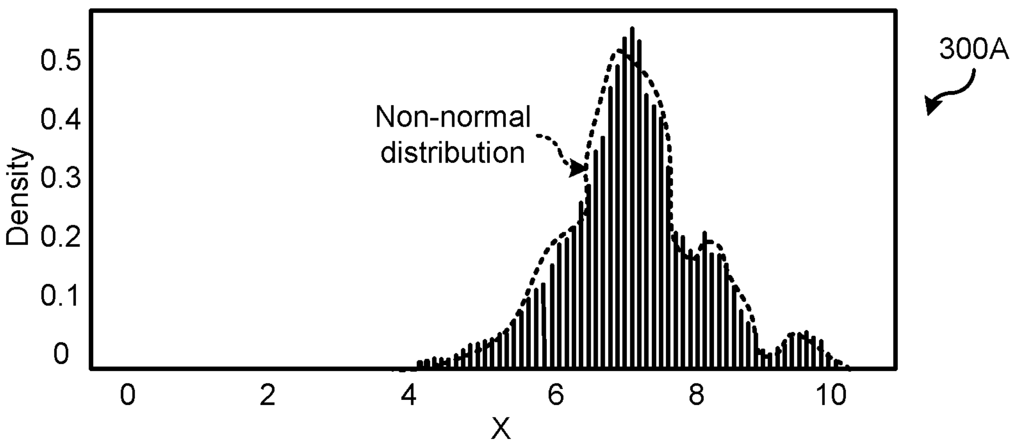
FIG. 3A shows an example of plot that shows a non-normal distribution of the input data, according to an embodiment.
Figure 3B:
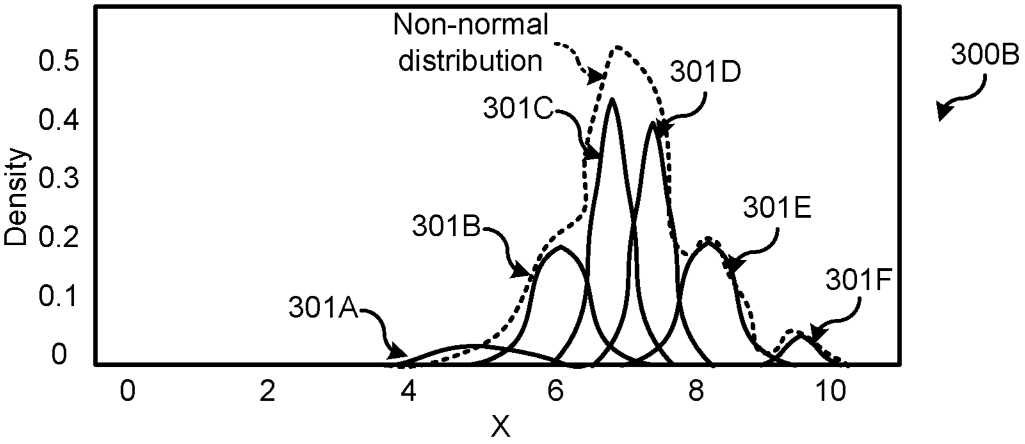
FIG. 3B shows an example of plot that shows the mixture model having k-clusters of normal distributions based on the non-normal distribution shown in FIG. 3A, according to an embodiment.

To illustrate, FIG. 2 shows a plot 200 of k-values for selecting an optimal k-value used for the mixture model 120. As shown, the optimal k-value 201 in this example is six based on the elbow method. FIG. 3A shows an example of plot 300A that shows a non-normal distribution of the input data 101. FIG. 3B shows an example of plot 300B that illustrates k-clusters 301A-F of normal distributions in the mixture model 120 for normalizing the input data 101 based on the optimal k-value shown in FIG. 2 and the non-normal distribution shown in FIG. 3A. Other numbers of k-clusters may be used depending on the particular k-value that is selected. Each k-cluster 301 may represent a normal distribution of a subset of the distribution in the input data 101.

The computer system 110 may generate the mixture model 120 with the identified k-value (or the default k-value). In some embodiments, the computer system 110 may configure parameters of each k-cluster 301 to ensure that the k-cluster 301 correctly approximates the underlying input data 101. In these examples, the computer system 110 may apply a maximum likelihood function, which may be given by Equation (2):

$$\ln\left(p(x|\pi, u, \sum)\right) = \sum_{n=1}^{N} \ln\left(\sum_{k=1}^{k} \pi_k N\left(x|u_k, \sum_k\right)\right). \tag{2}$$

The computer system 110 may use the mixture model 120 to normalize the input data 101 for input to the machine learning model 130. For example, the computer system 110 may identify a k-cluster 301 to be used to normalize a particular data value in the input data 101. In some embodiments, the computer system 110 may identify the k-cluster 301 by selecting the k-cluster 301 that is closest to the given data value. The computer system 110 may determine the distance based on a difference between the particular data value and the mean of the k-cluster 301. The computer system 110 may then select the k-cluster 301 having the smallest distance to the particular data value. Once the k-cluster 301 is identified, the computer system 110 may normalize the particular data value based on the identified k-cluster 301. For example, the computer system 110 may repeat the process of identifying a k-cluster 301 and normalizing based on the identified k-cluster 301 for each data value in the input data 101. The normalization may be based on Equation 3:

$$(x_{ki}-\mu_{k\_min})/\Sigma_{k\_min} \tag{3},$$

in which:

$x_{ki}$ is the data value to be normalized, $\mu_{k\_min}$ is the mean of the closest cluster, and $\Sigma_{k\_min}$ is the variance of the closest cluster.

The machine-learning model 130 may be trained to output a prediction of the direction and/or magnitude of the input data 101 based on the normalized data that was generated from the input data 101 and the mixture model 120. Machine learning techniques for modeling may be used to train the machine learning model 130. Examples include gradient boosting (in particular examples, Gradient Boosting Machines (GBM), XGBoost, LightGBM, or CatBoost). Gradient boosting is a machine learning technique for regression and classification problems, which produces a prediction model in the form of an ensemble of weak prediction models, typically decision trees. GBM may build a model in a stage-wise fashion and generalizes the model by allowing optimization of an arbitrary differentiable loss function. Other machine learning approaches may be used as well, such as neural networks. A neural network, such as a recursive neural network, may refer to a computational learning system that uses a network of neurons to translate a data input of one form into a desired output. A neuron may refer to an electronic processing node implemented as a computer function, such as one or more computations. The neurons of the neural network may be arranged into layers. Each neuron of a layer may receive as input a raw value, apply a classifier weight to the raw value, and generate an output via an activation function. The activation function may include a log-sigmoid function, hyperbolic tangent, Heaviside, Gaussian, SoftMax function and/or other types of activation functions.

Figure 6A:
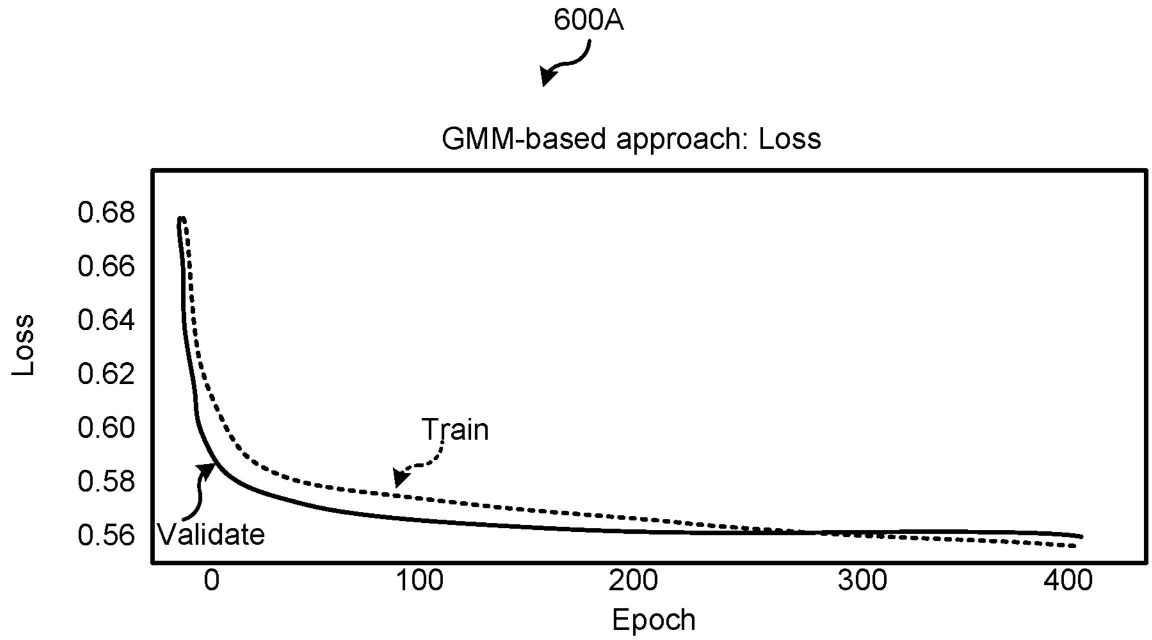
FIG. 6A shows a plot of loss when the mixture model is used for normalizing the input data, according to an embodiment.

The machine-learning model 130 may be trained with training data that has been normalized using a mixture model 120. In this manner, the machine-learning model 130 may be trained with training data that exhibits non-normal behavior. The training data may include model features that correlate with observable outcomes. The model features may include the feature columns described above. The hyperparameters for model training may be selected based on precision, recall, loss or other metric. For example, the number of epochs for training may be identified based on a loss function, as illustrated in the model loss plot shown in FIG. 6A. The training data, model parameters, model hyperparameters, model weights, and/or other data may be stored in the datastore 114 (which may be a database such as a relational database and/or other data storage).

Figure 4:
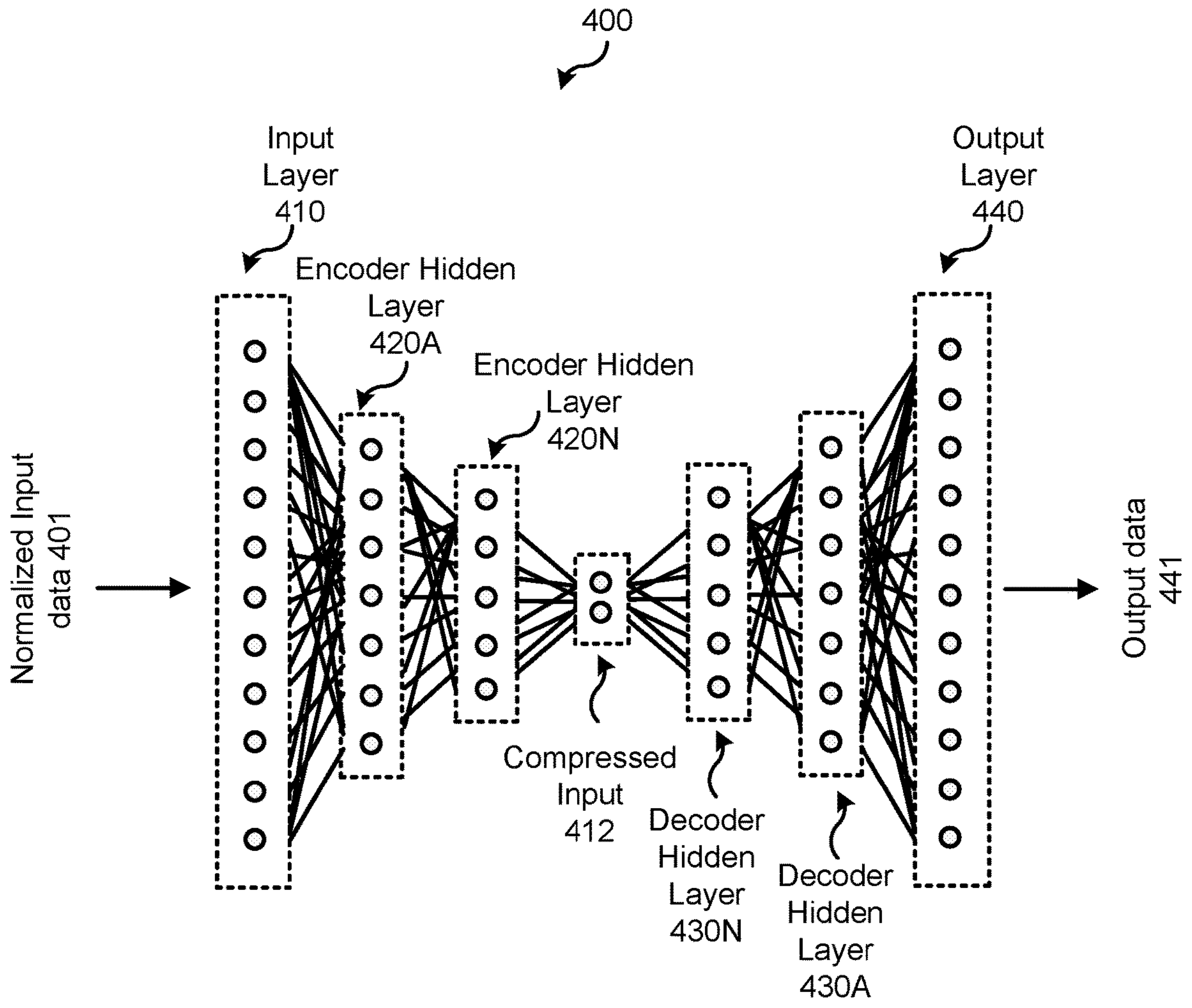
FIG. 4 shows a schematic example of an autoencoder trained to use the normalized input data, according to an embodiment.
Figure 5:
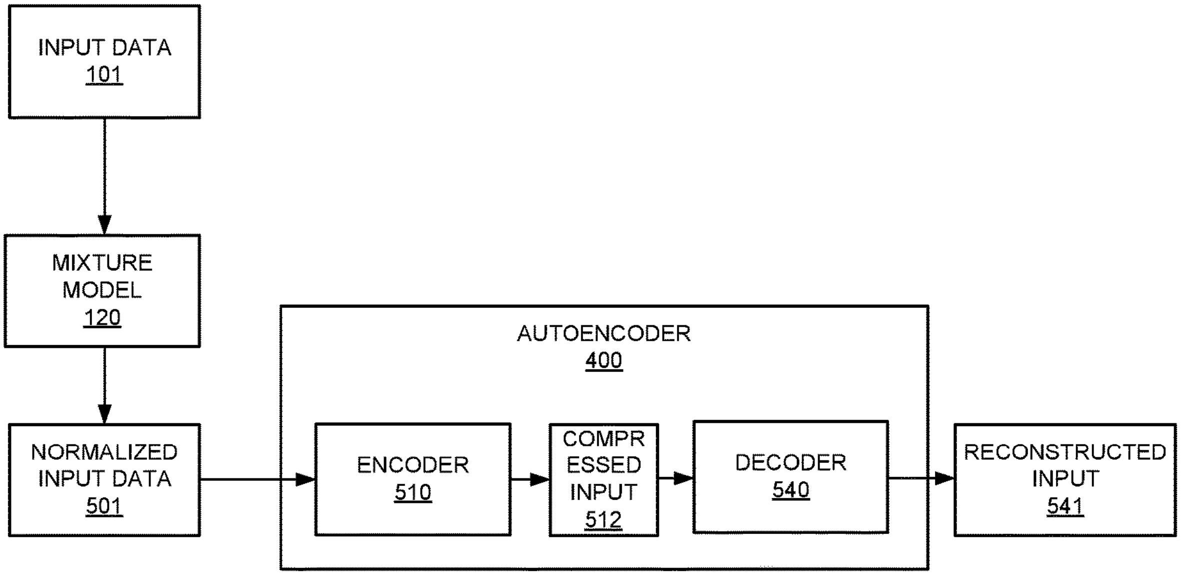
FIG. 5 shows a schematic data flow of the autoencoder illustrated in FIG. 4, according to an embodiment.

An example of a machine-learning model 130 that may be used is an autoencoder, which will now be described. FIG. 4 shows a schematic representation of an example of an autoencoder 400. The autoencoder 400 may include an input layer 410 that accepts normalized input data 401, one or more encoder hidden layers 420 (illustrated as encoder hidden layers 420A, N) that generate a compressed input 412, one or more decoder hidden layers 430 (illustrated as decoder hidden layers 430A, N), and an output layer 440 that generates output data 441, which may be a reconstructed version of the normalized input data 401. Although only two encoder hidden layers 420 are shown, other numbers of encoder hidden layers 420 may be used.

Each encoder hidden layer 420 may include a plurality of encoder neurons, or nodes, depicted as circles. Similarly, each decoder hidden layer 430 may include a plurality of decoder neurons, or nodes, depicted as circles. In some examples, each encoder neuron may receive the output of a neuron of a previous encoder hidden layer 420 or the normalized input data 401. For example, each encoder neuron in the encoder hidden layer 420A may receive at least a portion of the normalized input data 401 and output an encoding based on patterns observed in the normalized input data 401. Each neuron in an intermediate encoder hidden layer (not shown) may receive a respective encoding from each encoder neuron in the encoder hidden layer 420A. This process may continue through to intermediate encoder hidden layers. The last encoder hidden layer 420 (illustrated in FIG. 4 as encoder hidden layer 420N) may generate the compressed input 412 that is decoded through the one or more decoder hidden layers 430A,N to provide the reconstructed input 414.

In some examples, training and validating the autoencoder 400 may use historical input data, which may be normalized based on the mixture model 120. The historical input data may include model features that correlate with known outcomes such as a known direction and/or magnitude of the historical input data. For example, the model features may include values relating to a security so that those values may be correlated with known securities lending rates while training the autoencoder 400. The historical input data may be split into training data and validation data. For example, 80 percent of the historical input data may be allocated to the training data while 20 percent may be allocated to the validation data. Other proportional splits may be used as well.

Assessing Input Recreation by the Autoencoder 400

To assess recreation of the normalized input data 401, the computer system 110 may determine an input metric for the normalized input data 401 and an output metric for the output data 441, which is a recreation by the autoencoder 400 of the normalized input data 401. The input metric may include a mean squared error (MSE) of the measurement values of the normalized input data 401. The output metric may include a mean squared error (MSE) of the measurement values of the output data 441. A difference between the output metric and the input metric may indicate a level of performance by the autoencoder 400 in recreating the normalized input data 401. A smaller difference may indicate that the autoencoder 400 has recreated the input more effectively than if a larger difference resulted.

In some examples, when training the autoencoder 400, a threshold difference may be based on the difference between the output metric and the input metric. For example, the threshold difference may be equal to the difference between the output metric and the input metric. In some examples, the threshold difference may be equal to the difference between the output metric and the input metric plus or minus a predetermined error value, which may be selected by a user or determined based on a standard error of the distribution of the output data 441.

Validating the Autoencoder 400

Figure 6B:
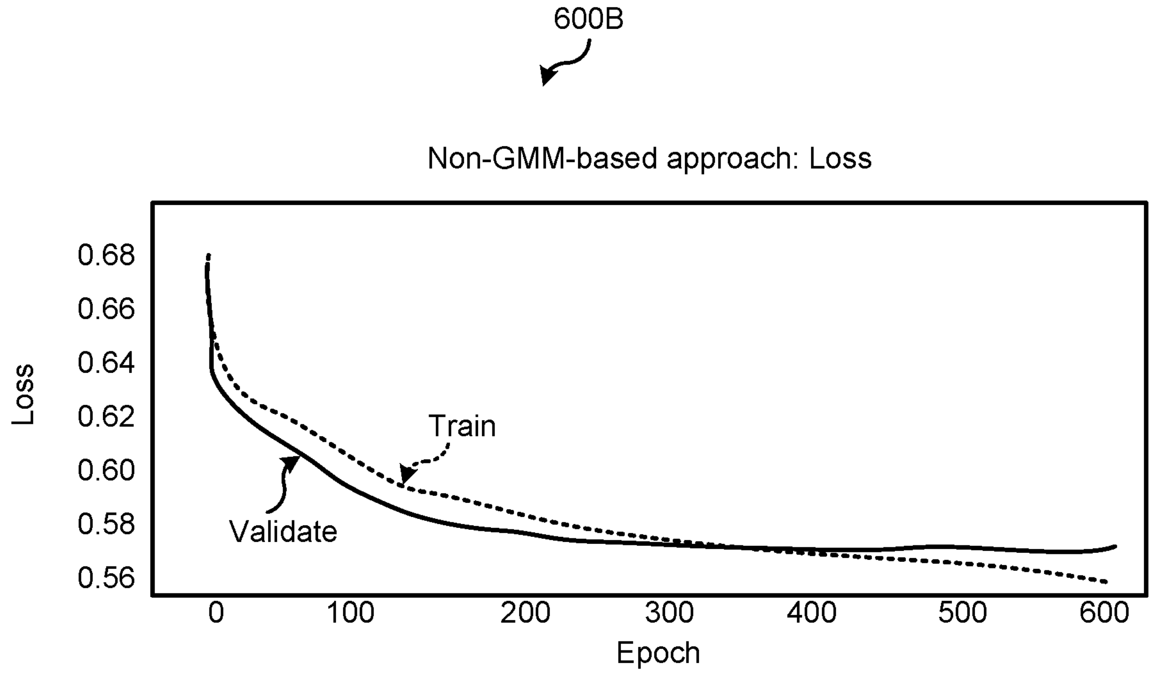
FIG. 6B shows a plot of loss when the mixture model is not used for normalizing the input data, according to an embodiment.

In some examples, the autoencoder 400 may be validated over an (I) number iterations, where I is a number greater than zero. For each iteration, the validation data may be used as normalized input data 401 to the autoencoder 400 for validation. In some examples, at each iteration, the validation data may be randomly selected, thereby ensuring random distribution of validation data across all of the iterations (I). Post-validation, the computer system 110 may generate loss metrics. Examples of such metrics are illustrated by the plots 600A (using normalization based on mixture model 120) and 600B (not using normalization based on mixture model 120) respectively illustrated in FIGS. 6A and 6B.

Using the Autoencoder 400 to Predict the Direction and/or Magnitude of Input Data Once the autoencoder 400 is trained and validated, the processor 102 may use the autoencoder 400 to make a prediction of the direction and/or magnitude of the input data 101. For example, the computer system 110 may provide, normalized input data 401 (which may be normalized version of the input data 101 using the mixture model 120) to the autoencoder 400. The normalized input data 401 may be encoded by the encoded hidden layers 420(A-N) to generate an compressed input 412. The autoencoder 400 may decode the compressed input 412 through the decoder hidden layers 430(A-N) to generate the output data 441. The computer system 110 may assess the normalized input data 401 using an input metric of the compressed input 412 and an output metric of the output data 441. For example, the input metric may be the MSE of the normalized input data 401 and the output metric may be the MSE of the output data 441. The computer system 110 may determine a difference between the output metric and the input metric and compare the difference to a threshold difference. Deviating from the threshold difference may indicate that the input data 101 does not match the training data, indicating that the direction and/or magnitude will vary from the training data. On the other hand, if the threshold difference is not deviated from, the direction and/or magnitude of the input data 101 may be the same as the direction and/or magnitude of the training data. In some examples, the size of the deviation may be indicative of a probability that the direction and/or magnitude of the input data 101 will vary from the direction and/or magnitude of the training data.

In some embodiments, the machine learning model 130 may be trained to predict the direction and/or magnitude of the input data 101 over multiple domains. For example, the machine learning model 130 may be trained on training data sets that include historical data for multiple securities. In this manner, the computer system 110 may not train an individual machine learning model 130 for each security, but rather may train a single machine learning model 130 across multiple securities, promoting scale and efficiency because of the reduced computational processing to train and use multiple models and the reduced memory footprint to store the multiple models.

Figure 7:
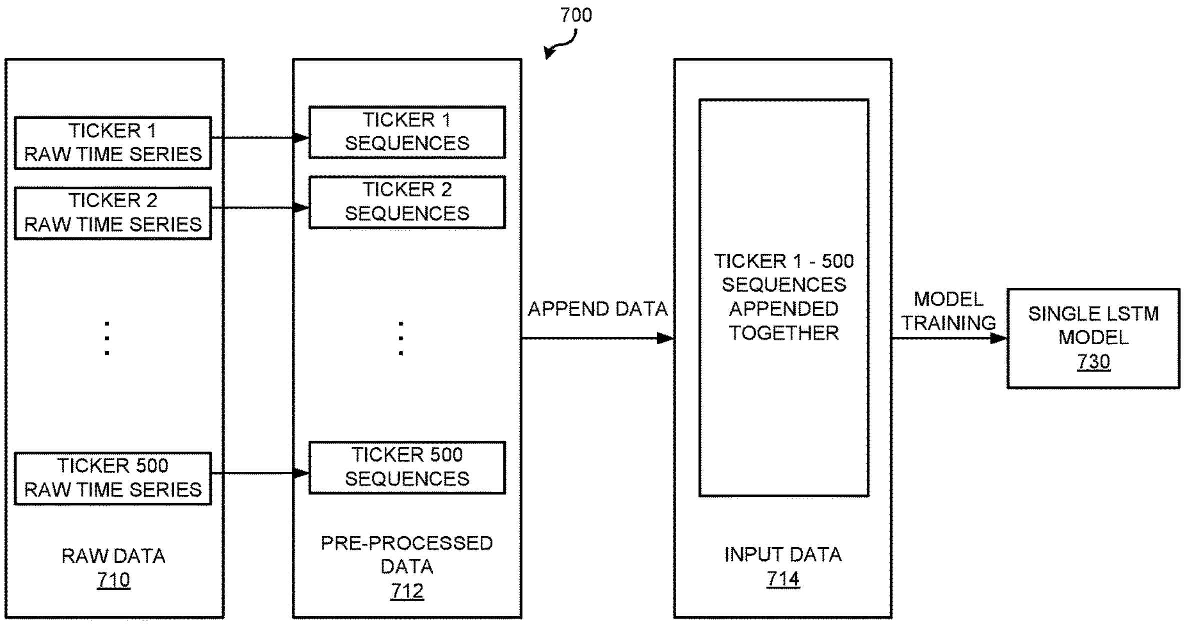
FIG. 7 shows a schematic diagram of training a single LSTM model from multiple time series of data across multiple domains, according to an embodiment

An example of training a machine learning model 130 across multiple domains such as multiple securities or other domains in other contexts will now be described with reference to FIG. 7. FIG. 7 shows a schematic diagram of training a single Long-Term Short-Term (LSTM) model 730 using input data from a plurality of domains. Although training a single LSTM model is illustrated, other types of machine-learning models may be trained based on the disclosure herein. As shown, the input data includes market data for different securities. In this example, the single LSTM model 730 may be trained to output predictions on market data for multiple securities. Based on such training, the single LSTM model 730 may transfer learning from the training data of a set of securities to any one of the securities. As such, the single LSTM model 730 may output predictions for any of the securities in the training data without having to train individual models for each security, reducing computational load for training and executing machine learning models and reducing storage requirements by not having to store multiple machine learning models.

In FIG. 7, training the single LSTM model 730 may be based on raw data 710 that includes multiple domains of input data. As shown, the raw data 710 includes market data for 500 tickers each identifying a respective security, although other numbers of domains of input data may be used. Each ticker's raw data may include a time series of market data. For example, each ticker's raw data may include a closing (or other) price of the security over a period of time such as two years. Other durations of time may be used as well. Because each security may behave independently over time from another security, machine learning systems may typically use a specific model trained specifically for each security. In this example, 500 machine learning models would be trained, stored, and executed. Training a single LSTM model 730 as disclosed herein obviates this need.

The computer system 110 may generate pre-processed data 712 based on the raw data 710. The pre-processed data 712 may include sequences of data corresponding to the time series of data. For example, the computer system 110 may take each ticker's time series data and generate N sequences of data, where N may be selected based on the size of the time series of data. As shown, N=4 in which sequences [1-12], [2-13], [3-14], and [4-15] are used. Other numbers of sequences may be used as appropriate. The result will be that the pre-processed data 712 will include 500 sets of N sequences. It should be noted that the raw data 710 may be normalized during pre-processing using the mixture model 120 described with respect to FIG. 1.

Using the pre-processed data 712, the computer system 110 may generate input data 714 for training the single LSTM model 730. For example, the computer system 110 may append the sequences in the pre-processed data 712 together to form an appended set of sequences. In the illustrated example, the input data 714 will include 500 sequences appended together. In this manner, the single LSTM model 730 may be trained from sequence data derived from market data of all tickers in the raw data 710.

The single LSTM model 730 may be trained in various ways based on the input data 714. For example, the single LSTM model 730 may be trained with all the sequences together so that the LSTM model 730 is trained using all market data of all tickers. In another example, the single LSTM model 730 may be trained with a ticker identifier as a feature so that the LSTM model 730 is trained specifically for each ticker while maintaining an ability to use a single model for all tickers.

In some embodiments, the computer system 110 may use a parallel neural network architecture 150 to make predictions. For example, referring to FIG. 8, the parallel neural network architecture 150 may include a plurality of neural networks (illustrated as networks 810A-N).

Each network 810 may be an RNN, which is a neural network that can process a sequence of data such as the time series of the input data 101 illustrated in FIG. 1. An RNN performs the same task for each element of a sequence and generate an output that depends on previous computations. Thus, an RNN may retain knowledge about previous data in the sequence. In the context of the input data 101, RNNs may process a time series of market data to be able to make predictions relating to the market data.

Each network 810 may have a corresponding input layer 812, one or more RNN layers 814A-N, and one or more dense layers 816A-N. Thus, the parallel neural network architecture 150 may include multiple networks 810 and multiple input layers 812. Each input layer 812 may receive a respective sequence of data, such as the ticker sequences in the pre-processed data 712. In this example, the parallel neural network architecture 150 may execute on multiple sequences of data simultaneously, such as by executing multiple input data for multiple tickers.

Within each network 810, the connections between the input layer 812 and the RNN layers 814 may be parameterized by a weight matrix. The weights in the RNN layers 814 and the dense layers 816 represent recurrent connections, where connections from between RNN layers 814 and the dense layer 816 at time-step t to those at time-step t+1 are parametrized by a weight matrix Whh of size nh×nh. as input data is passed through the input layer 812 through the RNN layers 814 and dense layers 816, the weight matrices are updated.

The computer system 110 may merge outputs of the dense layer 816N of each network 810 to make predictions. Doing so may enable global knowledge of the networks 810 to make a prediction based on input data. For example, in operation, if the time series of market data ten tickers are provided as input to the input layers 812 of the parallel neural network architecture 150, individual predictions for each of the tickers may be made based on global knowledge, such as weight matrices, from the networks 810. For example, Table 1 shows results of 2-class prediction in a conventional stacked (series) architecture with five RNN units, Table 2 shows results of 2-class prediction in a conventional stacked architecture with ten RNN units, Table 3 shows results of the 2-class prediction in a parallel neural network architecture using five and ten RNN units (networks), and Table 4 shows results of the 2-class prediction in a parallel neural network architecture using five, ten, and fifteen RNN units.

TABLE 1

Results of stacked architecture with five RNN units.

| | Precision | Recall | F1-score | Support |
|---|---|---|---|---|
| Class 0 | 0.62 | 0.47 | 0.53 | 1084 |
| Class 1 | 0.59 | 0.72 | 0.65 | 1151 |
| Accuracy | | | 0.60 | 2235 |
| Macro Average | 0.60 | 0.60 | 0.59 | 2235 |
| Weighted Average | 0.60 | 0.60 | 0.59 | 2235 |

TABLE 2

Results of stacked architecture with ten RNN units.

| | Precision | Recall | F1-score | Support |
|---|---|---|---|---|
| Class 0 | 0.55 | 0.86 | 0.67 | 1084 |
| Class 1 | 0.72 | 0.34 | 0.46 | 1151 |
| Accuracy | | | 0.59 | 2235 |
| Macro Average | 0.63 | 0.60 | 0.57 | 2235 |
| Weighted Average | 0.64 | 0.59 | 0.56 | 2235 |

TABLE 3

Results of parallel neural network architecture using five and ten RNN units

| | Precision | Recall | F1-score | Support |
|---|---|---|---|---|
| Class 0 | 0.61 | 0.80 | 0.69 | 1084 |
| Class 1 | 0.73 | 0.52 | 0.61 | 1151 |
| Accuracy | | | 0.65 | 2235 |
| Macro Average | 0.67 | 0.66 | 0.65 | 2235 |
| Weighted Average | 0.67 | 0.65 | 0.65 | 2235 |

TABLE 4

Results of parallel neural network architecture using five, ten, and fifteen RNN units

| | Precision | Recall | F1-score | Support |
|---|---|---|---|---|
| Class 0 | 0.62 | 0.79 | 0.69 | 1084 |
| Class 1 | 0.73 | 0.52 | 0.61 | 1151 |
| Accuracy | | | 0.65 | 2235 |
| Macro Average | 0.67 | 0.66 | 0.65 | 2235 |
| Weighted Average | 0.67 | 0.66 | 0.65 | 2235 |

Figure 9:
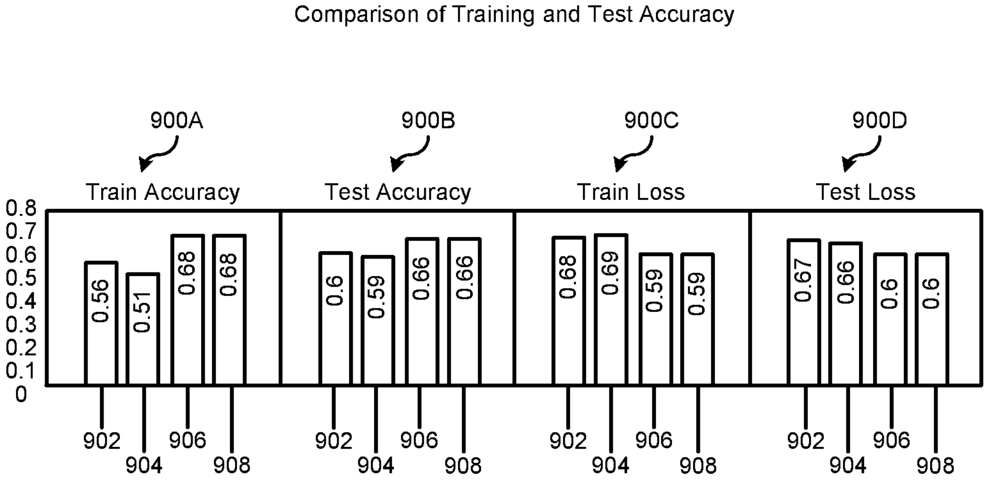
FIG. 9 shows plots of training accuracy, test accuracy, training loss, and training accuracy, according to an embodiment.

FIG. 9 shows plots of performance analysis, including training accuracy 900A, test accuracy 900B, training loss 900C, and test loss 900D. Across all plots 900A-D, the performance of a stacked architecture using five RNN units is shown as bar 902, the performance of a stacked architecture using ten RNN units is shown as bar 904, the performance of a parallel neural network architecture using five, ten, and 15 RNN units is shown as bar 906, and the performance of a parallel neural network architecture using five and ten RNN units is shown as bar 908.

The accuracy is higher in parallel neural network architectures with multiple sequences as compared to single sequence length. The loss is higher in single sequence length as compared to models with multiple sequence lengths. Thus, the models with parallel neural network architecture and multiple sequences outputs single sequence stacked architectures.

Figure 10:
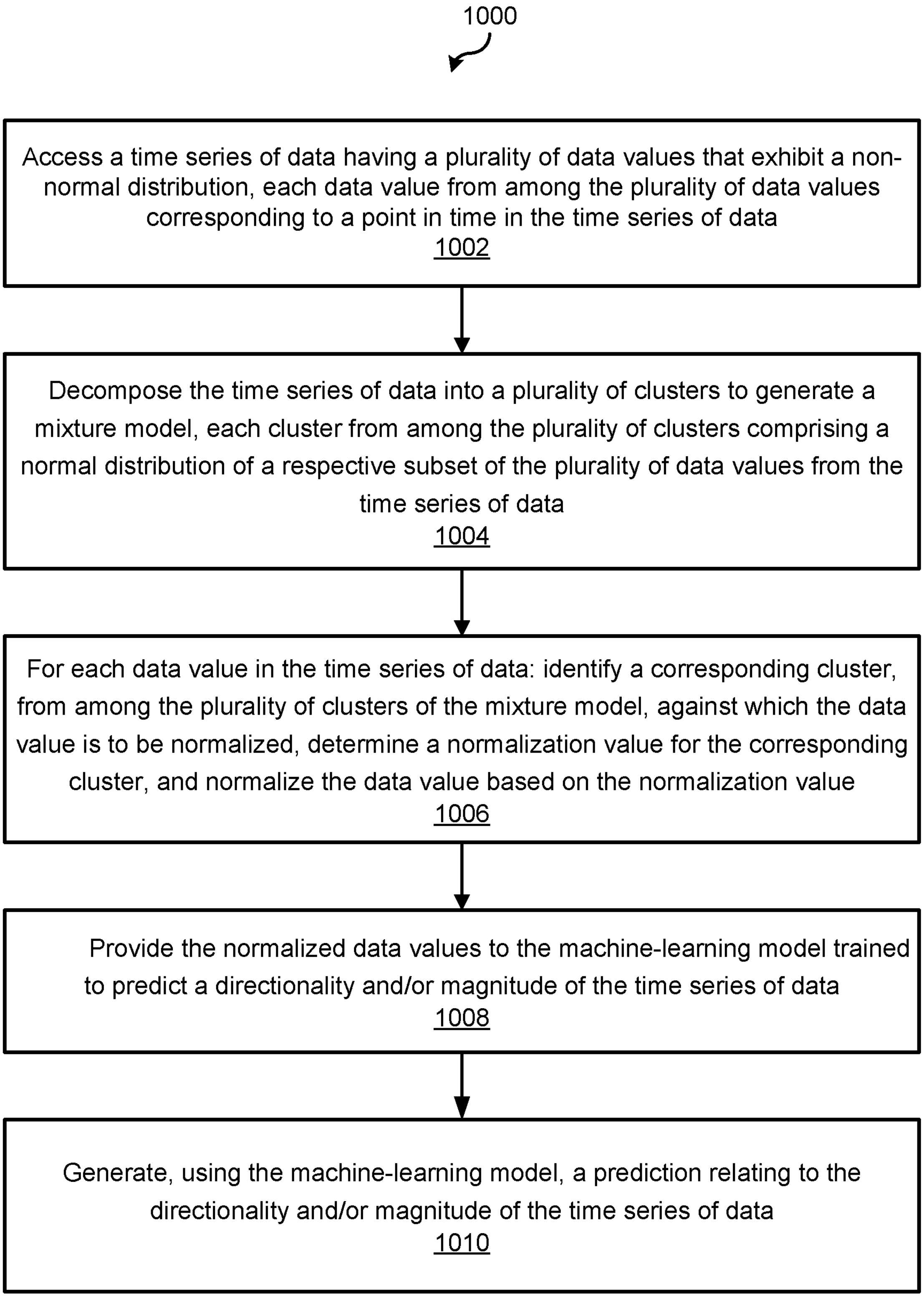
FIG. 10 shows an example of a method of making predictions on time series data based on a mixture model that approximates a non-normal distribution and a machine learning trained to use the approximated non-normal distribution of the mixture model, according to an embodiment.

FIG. 10 shows an example of a method 1000 of making predictions on time series data based on a mixture model that approximates a non-normal distribution and a machine learning trained to use the approximated non-normal distribution of the mixture model, according to an embodiment.

At 1002, the method 1000 may include accessing a time series of data having a plurality of data values that exhibit a non-normal distribution, each data value from among the plurality of data values corresponding to a point in time in the time series of data. An example of the time series of data may include the input data 101.

At 1004, the method 1000 may include decomposing the time series of data into a plurality of clusters to generate a mixture model (such as the mixture model 120), each cluster from among the plurality of clusters comprising a normal distribution of a respective subset of the plurality of data values from the time series of data.

At 1006, the method 1000 may include, for each data value in the time series of data: identifying a corresponding cluster, from among the plurality of clusters of the mixture model, against which the data value is to be normalized, determining a normalization value for the corresponding cluster, and normalizing the data value based on the normalization value.

At 1008, the method 1000 may include providing the normalized data values to the machine-learning model (such as machine learning model 130, which may include the autoencoder 400) trained to predict a directionality and/or magnitude of the time series of data.

At 1010, the method 1000 may include generating, using the machine-learning model, a prediction relating to the directionality and/or magnitude of the time series of data.

Figure 8:
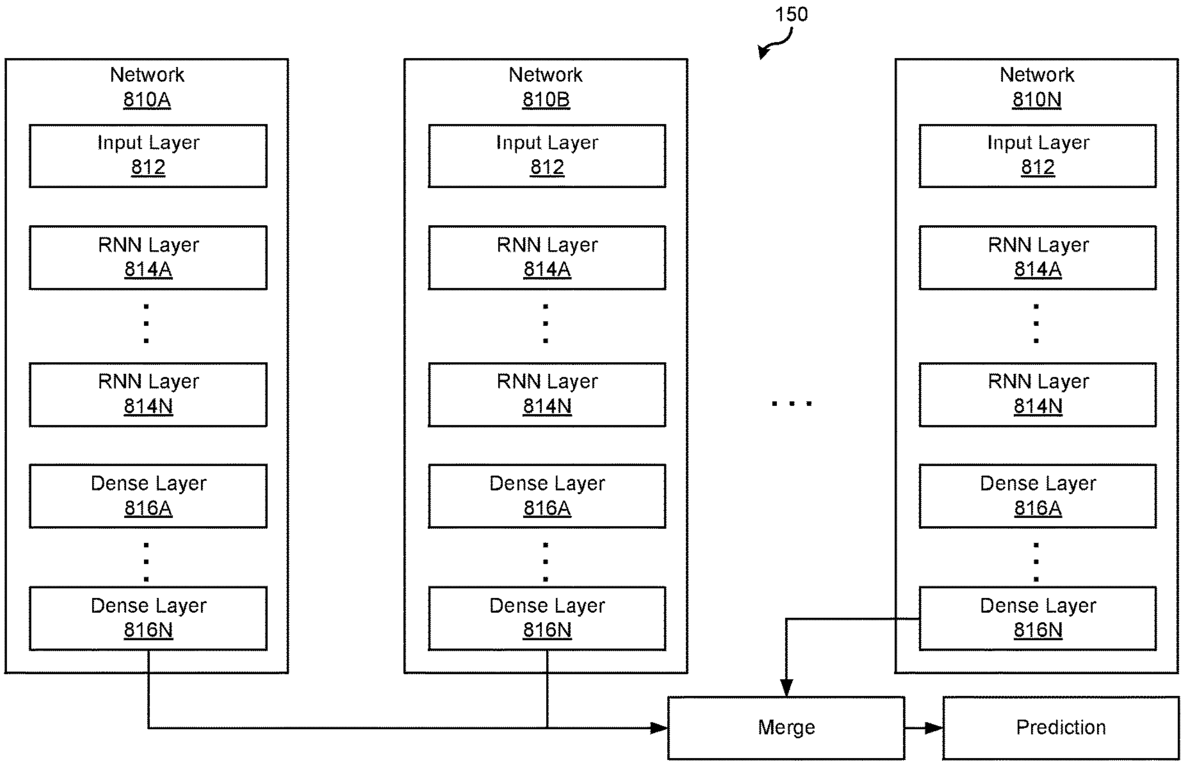
FIG. 8 shows a schematic diagram of a parallel neural network architecture, according to an embodiment.
Figure 11:
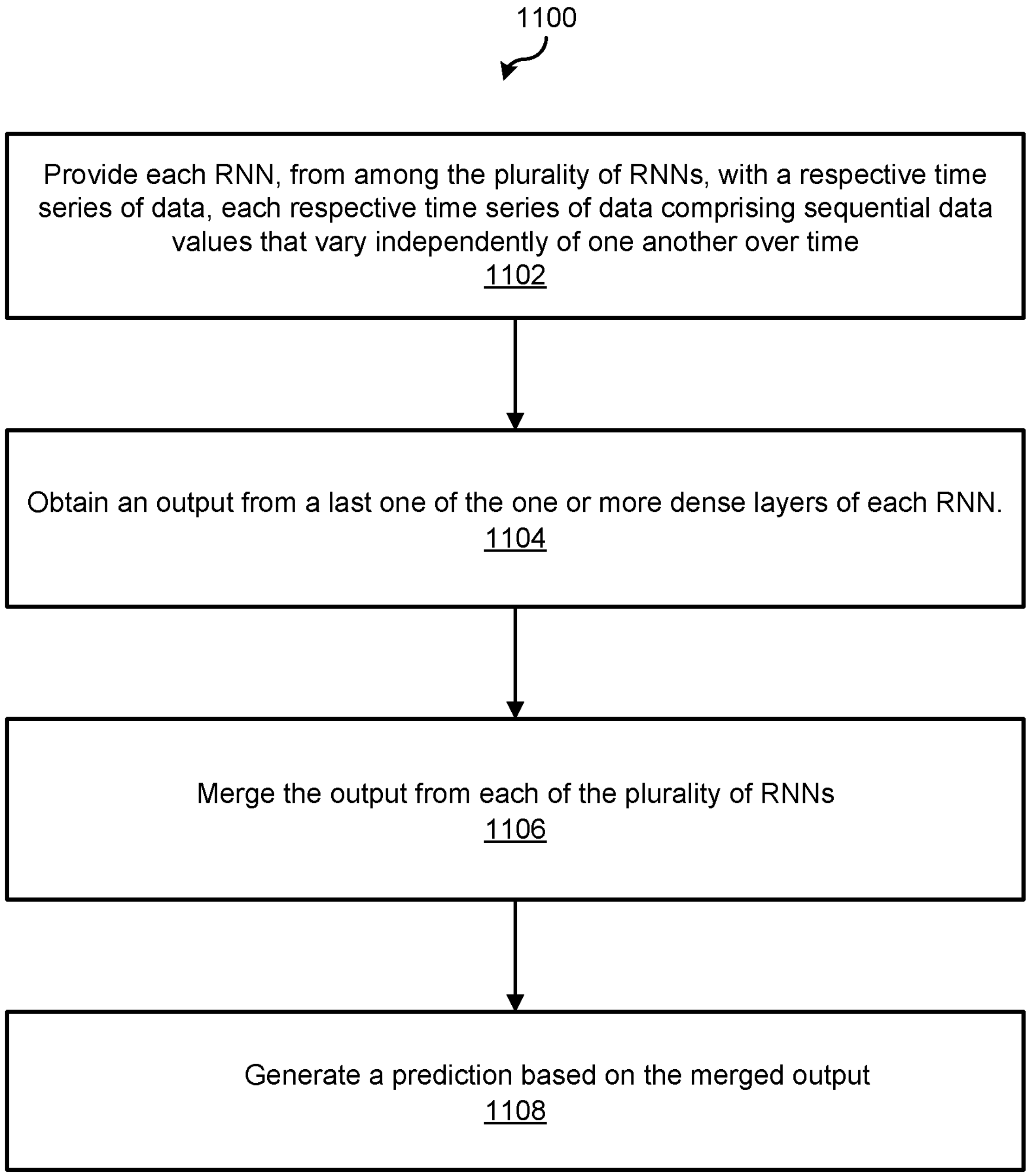
FIG. 11 shows an example of a method of using a parallel neural network architecture, according to an embodiment.

FIG. 11 shows an example of a method 1100 of using a parallel neural network architecture (such as the parallel neural network architecture 150 illustrated in FIGS. 1 and 8), according to an embodiment.

At 1102, the method 1100 may include providing each RNN, from among the plurality of RNNs, with a respective time series of data, each respective time series of data comprising sequential data values that vary independently of one another over time. At 1104, the method 1100 may include obtaining an output from a last one of the one or more dense layers of each RNN. At 1106, the method 1100 may include merging the output from each of the plurality of RNNs. At 1108, the method 1100 may include generating a prediction based on the merged output.

Figure 12:
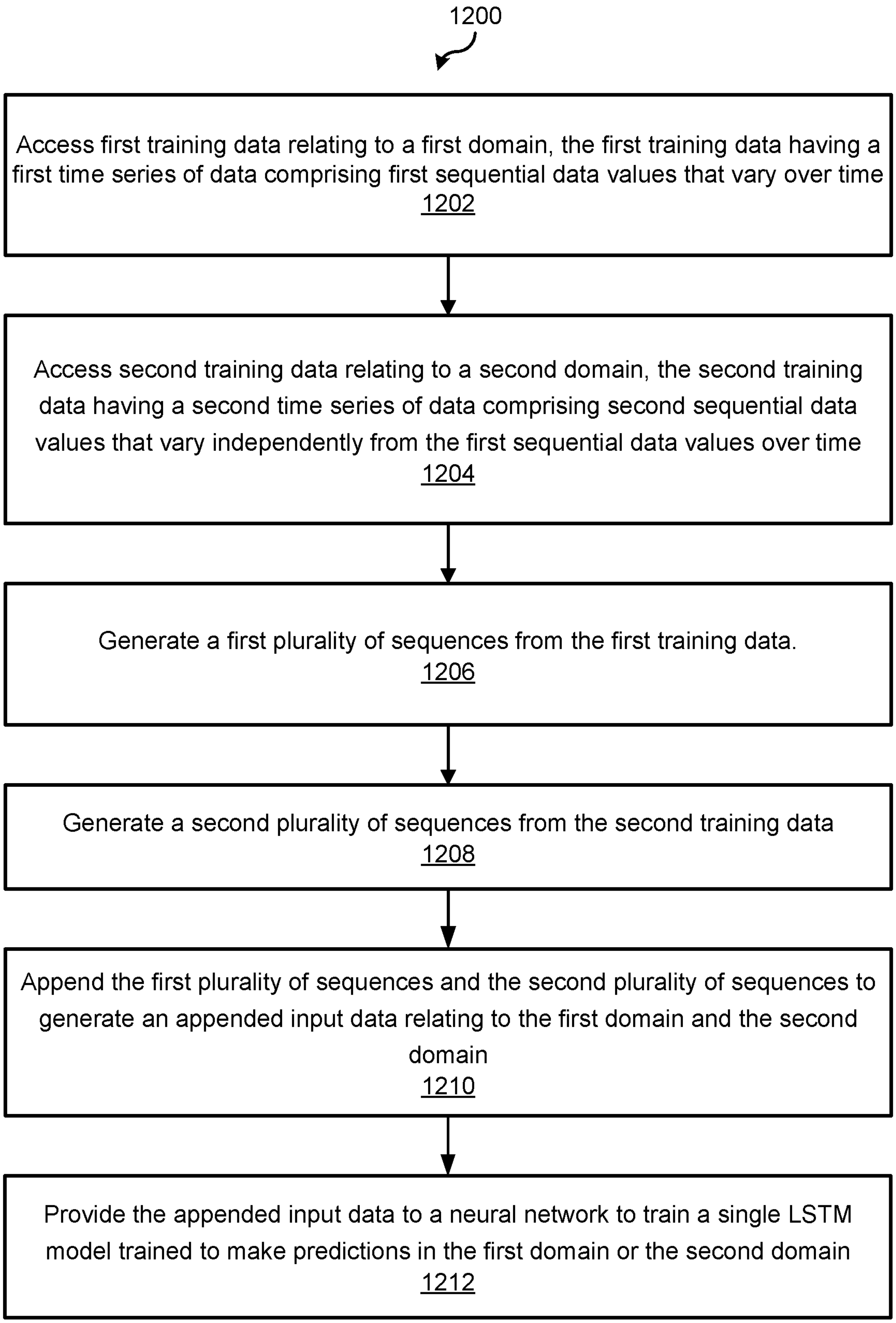
FIG. 12 shows an example of a method of training and using a single machine-learning model for multiple time series of data across multiple domains, according to an embodiment.

FIG. 12 shows an example of a method 1200 of training and using a single machine-learning model for multiple time series of data across multiple domains, according to an embodiment. At 1202, the method 1200 may include accessing first training data relating to a first domain, the first training data having a first time series of data comprising first sequential data values that vary over time. At 1204, the method 1200 may include accessing second training data relating to a second domain, the second training data having a second time series of data comprising second sequential data values that vary independently from the first sequential data values over time. At 1206, the method 1200 may include generating a first plurality of sequences from the first training data.

At 1208, the method 1200 may include generating a second plurality of sequences from the second training data. At 1210, the method 1200 may include appending the first plurality of sequences and the second plurality of sequences to generate an appended input data relating to the first domain and the second domain. At 1212, the method 1200 may include providing the appended input data to a neural network to train a single machine-learning model trained to make predictions in the first domain or the second domain. In some examples, the machine-learning model may include an RNN. In some examples, the machine-learning model may include an LSTM model.

The computer system 110 and the one or more client devices 160 may be connected to one another via a communication network (not illustrated), such as the Internet or the Internet in combination with various other networks, like local area networks, cellular networks, or personal area networks, internal organizational networks, and/or other networks. It should be noted that the computer system 110 may transmit data, via the communication network, conveying the predictions one or more of the client devices 160. The data conveying the predictions may be a user interface generated for display at the one or more client devices 160, one or more messages transmitted to the one or more client devices 160, and/or other types of data for transmission. Although not shown, the one or more client devices 160 may each include one or more processors, such as processor 112.

Each of the computer system 110 and client devices 160 may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionalities described herein.

This written description uses examples to disclose the implementations, including the best mode, and to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:

a memory that stores a plurality of time series of data each relating to a respective domain;

a processor programmed to:

access first training data relating to a first domain, the first training data having a first time series of data comprising first sequential data values that vary over time;

access second training data relating to a second domain, the second training data having a second time series of data comprising second sequential data values that vary independently from the first sequential data values over time;

generate a first plurality of sequences from the first training data, the first plurality of sequences being generated to include an ordered subset of sequential data values defined by a sliding temporal window over the first time series of data such that adjacent sequences share overlapping data values;

generate a second plurality of sequences from the second training data, the second plurality of sequences being generated to include an ordered subset of sequential data values defined by a second sliding temporal window over the second time series of data such that adjacent sequences share overlapping data values;

append the first plurality of sequences and the second plurality of sequences to generate an appended input data relating to the first domain and the second domain, wherein the appended input data comprises a concatenation of the first plurality of sequences and the second plurality of sequences into a unified training dataset that preserves temporal ordering of each sequence and associates each sequence with a domain identifier to train a single machine-learning model to learn feature relationships shared across the first domain and the second domain; and provide the appended input data to a neural network to train the single machine-learning model trained to make predictions in the first domain and/or the second domain.

2. The system of claim 1, wherein the processor is further programmed to:

receive input data relating to the first domain or the second domain, the input data comprising an input time series of data;

normalize the input data;

provide the normalized input data to the single machine-learning model; and generate a prediction based on the input data using the single machine-learning model.

3. The system of claim 2, wherein to normalize the input data, the processor is further programmed to:

generate a mixture model comprising a plurality of clusters of normal distributions that together approximate the input data.

4. The system of claim 3, wherein the processor is further programmed to:

for each data value in the input data:

identify a corresponding cluster from among the plurality of clusters;

determine a normalization value based on the corresponding cluster; and normalize the data value based on the normalization value.

5. The system of claim 2, wherein the neural network is part of a parallel neural network architecture comprising a plurality of neural networks, and wherein the processor is further programmed to:

provide the appended input data to an input layer of a first neural network of the parallel network architecture.

6. The system of claim 1, wherein each sequence from among the first plurality of sequences comprises a respective subset of the first time series of data.

7. The system of claim 6, wherein each sequence from among the first plurality of sequences have in common at least some of the first time series of data with a next sequence in the first plurality of sequences.

8. The system of claim 6, wherein a number of the plurality of sequences that are generated is based on a size of the first time series of data.

9. The system of claim 1, wherein the single machine-learning model comprises a single Long-term Short-term Memory (LSTM) model.

10. A method comprising:

accessing, by a processor, first training data relating to a first domain, the first training data having a first time series of data comprising first sequential data values that vary over time;

accessing, by the processor, second training data relating to a second domain, the second training data having a second time series of data comprising second sequential data values that vary independently from the first sequential data values over time;

generating, by the processor, a first plurality of sequences from the first training data, the first plurality of sequences being generated to include an ordered subset of sequential data values defined by a sliding temporal window over the first time series of data such that adjacent sequences share overlapping data values;

generating, by the processor, a second plurality of sequences from the second training data, the second plurality of sequences being generated to include an ordered subset of sequential data values defined by a second sliding temporal window over the second time series of data such that adjacent sequences share overlapping data values;

appending, by the processor, the first plurality of sequences and the second plurality of sequences to generate an appended input data relating to the first domain and the second domain, wherein the appended input data comprises a concatenation of the first plurality of sequences and the second plurality of sequences into a unified training dataset that preserves temporal ordering of each sequence and associates each sequence with a domain identifier to train a single machine-learning model to learn feature relationships shared across the first domain and the second domain; and providing, by the processor, the appended input data to a neural network to train the single machine-learning model trained to make predictions in the first domain and/or the second domain.

11. The method of claim 10, the method further comprising:

receiving input data relating to the first domain or the second domain, the input data comprising an input time series of data;

normalizing the input data;

providing the normalized input data to the single machine-learning model; and generating a prediction based on the input data using the single machine-learning model.

12. The method of claim 11, wherein normalizing the input data comprises: generating a mixture model comprising a plurality of clusters of normal distributions that together approximate the input data.

13. The method of claim 10, wherein the neural network is part of a parallel neural network architecture comprising a plurality of neural networks, and wherein the method further comprising: providing the appended input data to an input layer of a first neural network of the parallel network architecture.

14. The method of claim 10, wherein each sequence from among the first plurality of sequences comprises a respective subset of the first time series of data.

15. The method of claim 14, wherein each sequence from among the first plurality of sequences have in common at least some of the first time series of data with a next sequence in the first plurality of sequences.

16. The method of claim 14, wherein a number of the plurality of sequences that are generated is based on a size of the first time series of data.

17. The method of claim 10, wherein training a single machine-learning model comprises training a single Long-term Short-term Memory (LSTM) model.

18. A non-transitory computer readable medium storing instructions that, when executed by a processor, causes the processor to:

access first training data relating to a first domain, the first training data having a first time series of data comprising first sequential data values that vary over time;

access second training data relating to a second domain, the second training data having a second time series of data comprising second sequential data values that vary independently from the first sequential data values over time;

generate a first plurality of sequences from the first training data, the first plurality of sequences being generated to include an ordered subset of sequential data values defined by a sliding temporal window over the first time series of data such that adjacent sequences share overlapping data values;

generate a second plurality of sequences from the second training data, the second plurality of sequences being generated to include an ordered subset of sequential data values defined by a second sliding temporal window over the second time series of data such that adjacent sequences share overlapping data values;

append the first plurality of sequences and the second plurality of sequences to generate an appended input data relating to the first domain and the second domain, wherein the appended input data comprises a concatenation of the first plurality of sequences and the second plurality of sequences into a unified training dataset that preserves temporal ordering of each sequence and associates each sequence with a domain identifier to train a single machine-learning model to learn feature relationships shared across the first domain and the second domain; and provide the appended input data to a neural network to train the single machine-learning model trained to make predictions in the first domain and/or the second domain.

19. The non-transitory computer readable medium of claim 18, wherein the instructions, when executed, further cause the processor to:

receive input data relating to the first domain or the second domain, the input data comprising an input time series of data;

normalize the input data; provide the normalized input data to the single machine-learning model; and generate a prediction based the input data using the single machine-learning model.

20. The non-transitory computer readable medium of claim 18, wherein the single machine-learning model comprises a single Long-term Short-term Memory (LSTM) model.

* * * * *